(12) United States Patent
Ding et al.

(10) Patent No.: US 8,451,843 B2
(45) Date of Patent: May 28, 2013

(54) METHOD AND APPARATUS FOR SENDING AND RECEIVING ETHERNET PHYSICAL-LAYER OAM OVERHEAD

(75) Inventors: Chiwu Ding, Shenzhen (CN); Huaping Qing, Shenzhen (CN); Jun Cai, Shenzhen (CN); Li Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 347 days.

(21) Appl. No.: 12/778,486

(22) Filed: May 12, 2010

(65) Prior Publication Data

US 2010/0220599 A1 Sep. 2, 2010

Related U.S. Application Data

(63) Continuation of application No. PCT/CN2008/072949, filed on Nov. 5, 2008.

(30) Foreign Application Priority Data

Nov. 12, 2007 (CN) .......................... 2007 1 0170315

(51) Int. Cl.
*H04L 12/28* (2006.01)
(52) U.S. Cl.
USPC ......................................................... 370/392
(58) Field of Classification Search
None
See application file for complete search history.

(56) References Cited

U.S. PATENT DOCUMENTS

| 5,596,730 | A * | 1/1997 | Sekine ........................... 710/317 |
| 6,650,638 | B1 | 11/2003 | Walker et al. |
| 7,043,541 | B1 | 5/2006 | Bechtolsheim et al. |
| 2003/0137975 | A1 * | 7/2003 | Song et al. ..................... 370/353 |
| 2003/0235214 | A1 | 12/2003 | Leroux et al. |
| 2005/0122994 | A1 | 6/2005 | Mangin et al. |
| 2006/0002299 | A1 | 1/2006 | Mushtaq et al. |
| 2007/0065078 | A1 * | 3/2007 | Jiang .............................. 385/76 |
| 2007/0183333 | A1 | 8/2007 | Kaur et al. |

(Continued)

FOREIGN PATENT DOCUMENTS

| CN | 1610339 A | 4/2005 |
| CN | 101043437 A | 9/2007 |
| CN | 101436955 B | 4/2012 |
| JP | 2001-326667 A | 11/2001 |

OTHER PUBLICATIONS

International Search Report issued in corresponding PCT Application No. PCT/CN2008/072949; mailed Feb. 19, 2009.

(Continued)

*Primary Examiner* — Raj Jain
(74) *Attorney, Agent, or Firm* — Brinks Hofer Gilson & Lione

(57) ABSTRACT

A method and an apparatus for sending an Ethernet physical-layer OAM overhead, and a method and an apparatus for receiving an Ethernet physical-layer OAM overhead are disclosed herein. A method for sending an Ethernet physical-layer OAM overhead includes: adjusting the order of sending a payload block and part of Inter-Packet Gaps (IPGs) in a data stream to be transmitted; and when receiving a request for sending an OAM overhead, substituting the OAM overhead for the part of IPGs, and sending the OAM overhead before sending the payload block. Through the present invention, the order of sending IPGs and payload blocks in an MAC data stream can be adjusted, and the OAM overhead can be sent in time.

9 Claims, 10 Drawing Sheets

U.S. PATENT DOCUMENTS

2008/0075113 A1* 3/2008 Harley et al. ............... 370/466
2009/0086641 A1 4/2009 Mushtaq et al.
2009/0190595 A1 7/2009 Jiang et al.

OTHER PUBLICATIONS

Written Opinion of the International Searching Authority issued in corresponding PCT Patent No. PCT/CN2008/072949, mailed Feb. 19, 2009.

Hasegawa et al., "10 Gigabit Ethernet Media Converter" Hatachi Cable Review, No. 22, Aug. 2003.

Bynum, "Methods and Features of Adding Service Provider OAM Overhead to Existing PCSs" Phy. Level OAM & p802.3ah (EFM) Interim Meeting, Sep. 2001.

International Telecommunication Union, "OAM Functions and Mechanisms for Ethernet based Networks" Series Y: Global Information Infrastructure, Internet Protocol Aspects and Next-Generation Networks—Internet Protocol Aspects—Operation, Administration and Maintenance, Y.1731. May 2006.

IEEE Standards, "Part 3: Carrier Sense Multiple Access with Collision Detection (CSMA/CD) Access Method and Physical Layer Specifications; Amendment: Media Access Control Parameters, Physical Layers, and Management Parameters for Subscriber Access Networks" IEE Standard for Information Technology—Telecommunications and Information Exchange Between Systems—Local and Metropolitan Area Networks—Specific Requirements, IEEE 802.3ah 2004.

Draft Standard for Local and Metropolitan Area Networks—Amendment 5 to 802.1Q Virtual Bridged Local Area Networks: Connectivity Fault Management, IEEE P802.1ag/D8, Feb. 8, 2007.

\* cited by examiner

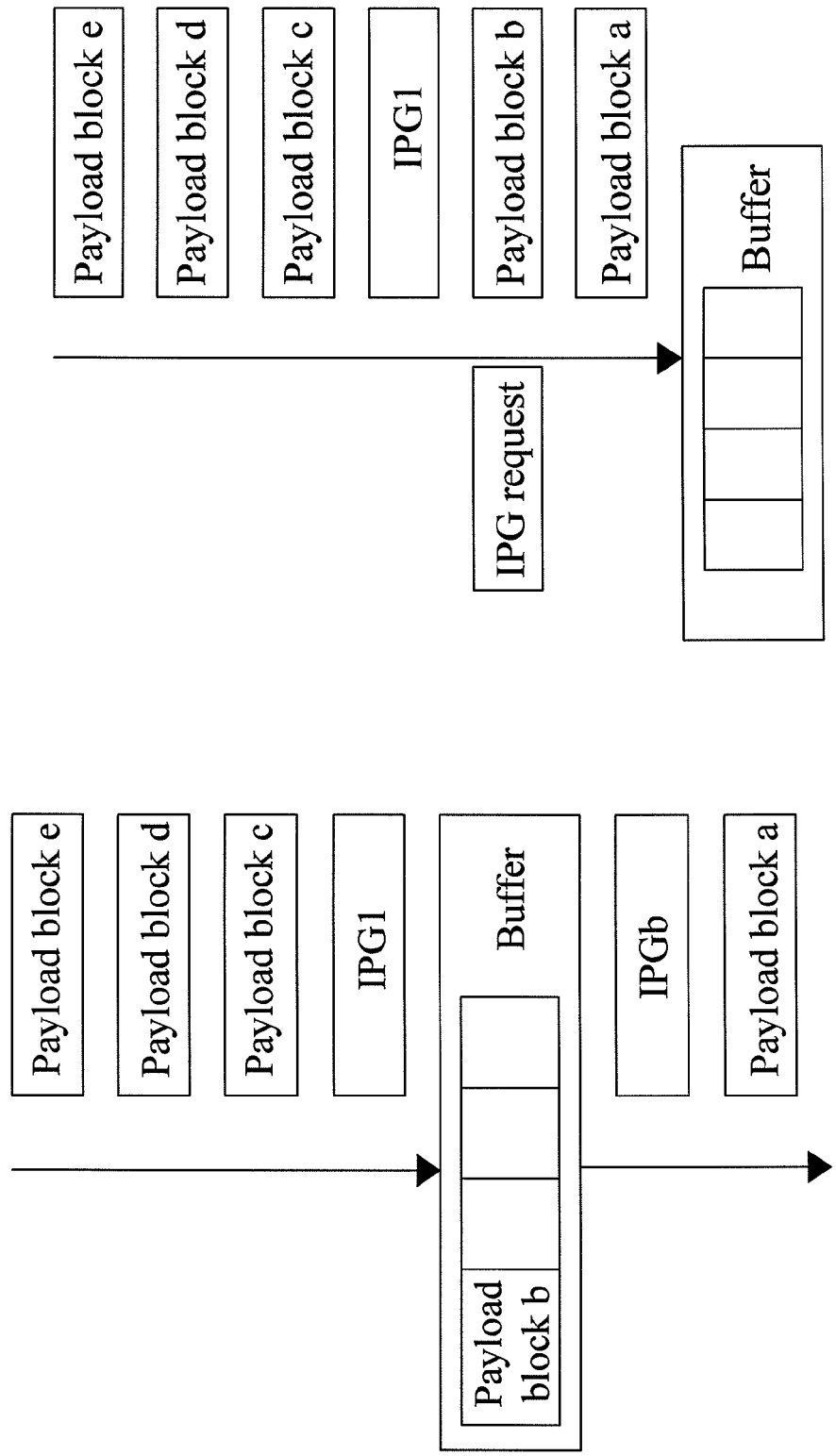

METHOD AND APPARATUS FOR SENDING AND RECEIVING ETHERNET PHYSICAL-LAYER OAM OVERHEAD

This application is a continuation of International Application No. PCT/CN2008/072949, filed on Nov. 5, 2008, which claims priority to Chinese Patent Application No. 200710170315.0, filed on 12 Nov. 2007, both of which are hereby incorporated by reference in their entireties.

FIELD OF THE INVENTION

The present invention relates to the Ethernet physical-layer technical specifications, and in particular, to a method and an apparatus for sending an Ethernet physical-layer Operation Administration Maintenance (OAM) overhead, and a method and an apparatus for receiving an Ethernet physical-layer OAM overhead.

BACKGROUND

For a long time, the Ethernet has been widely applied due to cost efficiency. With the progress of time and technology, the Ethernet evolves to a 100G rate. Currently, the 100G Ethernet (100GE) is under standardization. The Institute of Electrical and Electronic Engineers Higher Speed Study Group (IEEE HSSG) has specified the requirements for the High Speed Ethernet (HSE) with a rate higher than 10G, and defines the subsequent standards to be formulated in view of the market potentiality, technical maturity, and cost efficiency. As limited by the technical difficulty and cost efficiency, the 100GE will evolve from multi-lane to single-lane in the future.

FIG. 1 shows a model of a multi-lane HSE. As shown in FIG. 1, the multi-lane HSE includes: a Media Access Control (MAC) module, adapted to generate MAC data; a Reconciliation Sublayer (RS) module, which is a lane between the MAC module and the physical-layer module; a Physical Binding Layer (PBL) module, adapted to distribute and converge multi-lane data; a Physical Coding Sublayer (PCS) module, adapted to encode the data from the MAC module; a Physical Medium Attachment (PMA) module, adapted to convert codes into bit streams suitable for being transmitted on the physical layer, and synchronize the data decoding; a Physical Medium-Dependent (PMD) module, adapted to transmit signals, amplify and modulate signals, and rectify waves; and a Medium-Dependent Interface (MDI), which defines the connector type corresponding to different physical media and PMD devices. The 100 Gigabit Medium-Independent Interface (CGMII) is a high-speed interface. Generally, based on the processing rate of the existing components, the possible bit width of the CGMII interface of the multi-lane 100GE is 640 bits or 320 bits.

The Ethernet physical-layer OAM overhead is adapted to provide the connectivity monitoring and fault management for the entire link of the Ethernet. The OAM overhead may be encapsulated in an Inter-Packet Gap (IPG) for transmission. The IPG is generated when the MAC sublayer sends MAC frame data. In the prior art, after the MAC sublayer sends a complete MAC frame, the MAC sublayer cannot send the next MAC frame before expiry of a gap required for sending 96 bits of data. The gap is called Inter-Frame Gap (IFG) on the MAC sublayer, and is called an IPG on the MII and the physical sublayer. Because the minimum IFG alone is defined, the period, in which no data is available for sending after a complete MAC frame is sent, is also regarded as an IFG; and corresponds to the lower-layer IPG. The IPG reflects the data transmitted in the interval in which the physical layer stops sending the MAC frame data.

In the method for sending the OAM overhead in the prior art, if an OAM overhead needs to be sent while an MAC frame is being transmitted, it is necessary to wait until completion of sending the MAC frame, and then the OAM overhead is sent in the subsequent IPG. The detailed steps are described below:

Step 1: The data streams to be sent are sequentially received, and an IPG or a payload block in the data stream is sent in the time of every beat. The MAC data stream includes MAC frames and IPGs. As shown in 2a, the MAC frame is payload data in the data stream, and an MAC frame includes several payload blocks. For example, the first MAC frame includes a payload block a and a payload block b, and the second MAC frame includes a payload block c, a payload block d, and a payload block e. An IPG1 exists between the first MAC frame and the second MAC frame, namely, between the payload block b and the payload block c.

Step 2: MAC data streams are received sequentially. When the payload block b is received, a request for providing an IPG is received. The IPG is used to send an OAM overhead. As shown in FIG. 2b, a request for providing an IPG is received in the process of receiving the payload block b.

Step 3: The payload block a and the payload block b are sent, as shown in FIG. 2. In this step, no IPG is available for sending the OAM overhead, and it is necessary to wait to see whether the next beat is an IPG.

Step 4: The IPG1 after the payload block b is used to send the OAM overhead, as shown in FIG. 2d.

Step 5: The subsequent payload blocks c, d, and e are sequentially sent, as shown in FIG. 2e.

In the preceding process, after an IPG request is received, which requests for an IPG for sending the OAM overhead, it is necessary to wait for sending the OAM overhead. That is, the OAM overhead is sent by using the subsequent IPG only when the sending of the MAC frame is complete. This causes that the OAM overhead cannot be sent in time.

SUMMARY

The embodiments of the present invention provide a method and an apparatus for sending an Ethernet physical-layer OAM overhead, and a method and an apparatus for receiving an Ethernet physical-layer OAM overhead, to send the OAM overhead in time.

A method and an apparatus for sending an Ethernet physical-layer OAM overhead in an embodiment of the present invention are implemented through the following technical solution:

A method for sending an Ethernet physical-layer OAM overhead includes:

adjusting the order of sending payload blocks and part of IPGs in a data stream to be transmitted; and when receiving a request for sending an OAM overhead, substituting the OAM overhead for the part of IPGs, and sending the OAM overhead before sending the payload blocks.

A method for sending an Ethernet physical-layer OAM overhead includes:

when forwarding payload blocks in a data stream, if a request for providing an IPG is received, storing the payload blocks ready for forwarding into a buffer, and using the OAM overhead as the data currently to be sent.

An apparatus for sending an Ethernet physical-layer OAM overhead includes: a reconciling module, a data buffer, an IPG buffer, and at least one OAM sending module.

The reconciling module is adapted to store part of IPGs in a received data stream into the IPG buffer, and store payload blocks and the remaining IPGs in the received data stream into the data buffer; send the IPGs in the IPG buffer to the OAM sending module, and then send the payload blocks and the remaining IPGs in the data buffer to the OAM sending module.

The data buffer is adapted to store the payload blocks and the remaining IPGs.

The IPG buffer is adapted to store part of the IPGs.

The OAM sending module is adapted to substitute the OAM overhead for the part of the IPGs, send the OAM overhead, and then send the IPGs and the payload blocks in the data buffer.

An apparatus for sending an Ethernet physical-layer OAM overhead includes: a reconciling module, a buffer, and at least one OAM sending module.

The reconciling module is adapted to store the payload blocks ready for forwarding into the buffer, and use the OAM overhead as the data currently to be sent.

The buffer is adapted to store the payload blocks.

The OAM sending module is adapted to send the OAM overhead and then send the payload blocks in the buffer.

In the technical solution under the present invention, by adjusting the order of the payload blocks and part of IPGs in the data stream, the IPGs are instantly available for sending the OAM overhead, and then the payload blocks and the remaining IPGs are sent. In this way, the OAM overhead is sent in time.

BRIEF DESCRIPTION OF THE DRAWINGS

To make the technical solution under the present invention or the prior art clearer, the accompanying drawings for illustrating the embodiments of the present invention or the prior art are outlined below. Evidently, the accompanying drawings are for the exemplary purpose only, and those skilled in the art can derive other drawings from such accompanying drawings without making any creative effort.

FIG. 6a to FIG. 6d show data streams corresponding to different steps in a sending method in the second embodiment of the present invention;

DETAILED DESCRIPTION OF THE EMBODIMENTS

The embodiments of the present invention provide a method for sending an Ethernet physical-layer OAM overhead to adjust the order of sending the payload blocks and part of IPGs in the MAC data stream, and send the OAM overhead before sending the payload blocks.

In the prior art, an MAC frame gap is variable. Although it is stipulated that the minimum gap between adjacent MAC frames is 96 bits, the IPG traffic is very low when the MAC frame length is the maximum value in the variable range. For example, the prior art stipulates that the minimum gap is 96 bits; when the MAC frame length is the maximum value of 1500 bytes, the IPG traffic is $1G \times 96/(96+1500 \times 8)$ for a 1G Ethernet. In this case, because the MAC frame length is the maximum value of 1500 bytes, the IPG traffic is the minimum value, and the IPG may be not enough for sending the OAM overhead.

The technical solution under the present invention is expounded below with reference to the accompanying drawings. Evidently, the embodiments provided herein are for the exemplary purpose only, and are not all of the embodiments of the present invention. Those skilled in the art can derive other embodiments from the embodiments provided herein without making any creative effort, and all such embodiments are covered in the protection scope of the present invention.

To make the technical solution under the present invention clearer to those skilled in the art, the following describes the embodiments of the present invention in more detail with reference to the accompanying drawings.

Figure 3:
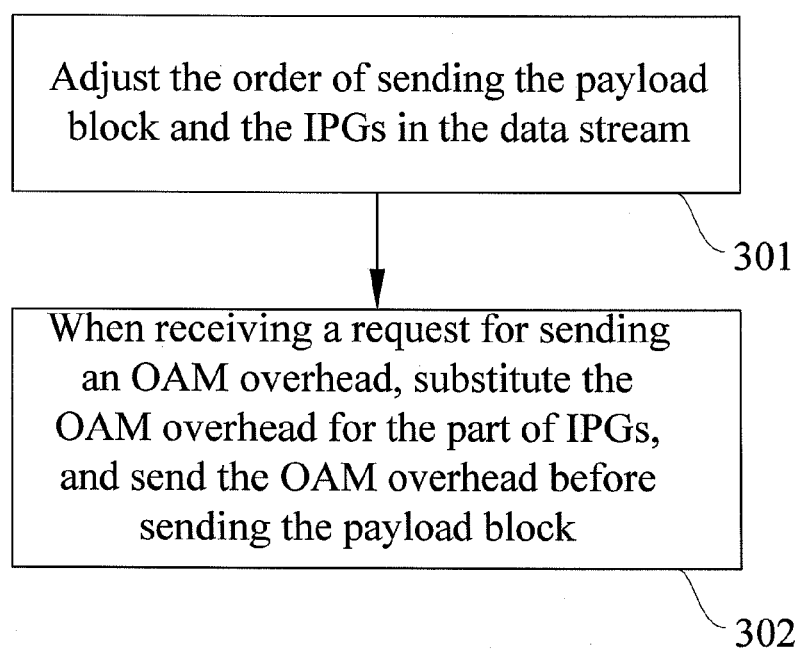
FIG. 3 is a flowchart of a sending method in the first embodiment of the present invention.

As shown in FIG. 3, the method in the first embodiment of the present invention includes the following steps:

Step 301: The order of sending payload blocks and part of IPGs in a data stream is adjusted.

Specifically, the RS module receives a data stream, stores part of the IPGs in the data stream into an IPG buffer, and stores the payload blocks and the remaining IPGs in the data stream into the data buffer.

The process of storing part of IPGs in the data stream into the IPG buffer and storing the payload blocks and the remaining IPGs in the data stream into the data buffer includes:

when the number of IPGs stored in the IPG buffer reaches or exceeds the preset upper threshold, writing all IPGs in the received data stream into the data buffer; and when the number of IPGs stored in the IPG buffer is less than the preset upper threshold, writing all IPGs in the received data stream into the IPG buffer.

When the number of IPGs stored in the IPG buffer reaches or exceeds the preset upper threshold, it indicates that the IPG buffer has enough IPGs for sending the OAM overhead. In this case, the IPGs in the data stream do not need to be stored into the IPG buffer, but all the IPGs in the data stream are all stored into the data buffer.

Conversely, when the number of IPGs stored in the IPG buffer is less than the preset upper threshold, the IPGs in the received data stream are stored into the IPG buffer. The payload block in the data stream is stored into the data buffer.

Step 302: When receiving a request for sending an OAM overhead, the part of IPGs are replaced with the OAM overhead, and the OAM overhead is sent before the payload blocks are sent.

In practice, a tag may be affixed to the IPG removed out of the IPG buffer, and then the IPG is sent to the OAM sending module. Accordingly, the OAM sending module substitutes the OAM overhead for the tagged part of the IPG OAM overhead, sends the OAM overhead, and forwards the IPGs and the payload block sent from the RS module and stored in the data buffer.

In the preceding step, the RS module can provide the IPG in the IPG buffer when receiving a request for the IPG In this way, the order of sending IPGs and the payload blocks in the data stream is adjusted, and the OAM overhead is sent in time.

The preceding step further includes: notifying the MAC module to reduce the rate of the payload blocks in the data stream when the number of IPGs in the IPG buffer is less than the preset less threshold. When the number of IPGs stored in the IPG buffer is less than the preset less threshold; it indicates that the IPG buffer lacks the IPG for sending the OAM overhead. In this case, the MAC module is notified to reduce the rate of the payload blocks in the data stream, and the IPGs in the data stream increase accordingly. Therefore, more IPGs are stored in the IPG buffer to meet the requirements of sending more OAM overheads.

The MAC module reduces the rate of sending the data stream. For example, when the total rate is 100 Gbit/s (100 Gbit/s is abbreviated as 100G and other rate-related expressions are similar to this), the rate of the payload blocks of the MAC frame sent by the MAC module to the RS module is 99.5G, and therefore, the IPG rate is 0.5G If a 0.6G OAM overhead needs to be sent at this time, because 0.5G is less than 0.6G the rate is not enough if the IPG is replaced with the OAM overhead simply. In this case, the rate of the payload blocks sent by the MAC module to the RS module needs to be reduced, for example, the rate is reduced to 99.4G, and therefore, the rate of the IPG sent by the MAC module to the RS module is 0.6G which is enough for sending the 0.6G OAM overhead. Reducing the rate of the payload blocks from 99.5G to 99.4G is a backpressure process. The backpressure aims to reduce the rate of payload blocks and generate more IPGs.

When the number of IPGs in the IPG buffer reaches or exceeds the preset lower threshold, it indicates that the IPGs stored in the IPG buffer are enough for sending the OAM overhead. In this case, the MAC module may be notified not to reduce the rate of the payload blocks in the data stream.

Provided below is a complete example of the first embodiment of the method.

Step A: When the number of IPGs in the IPG buffer reaches or exceeds the preset upper threshold, the IPGs in the data stream are written into the data buffer; when the number of IPGs in the IPG buffer is less than the preset upper threshold, the IPGs in the data stream are written into the IPG buffer.

Figure 1:
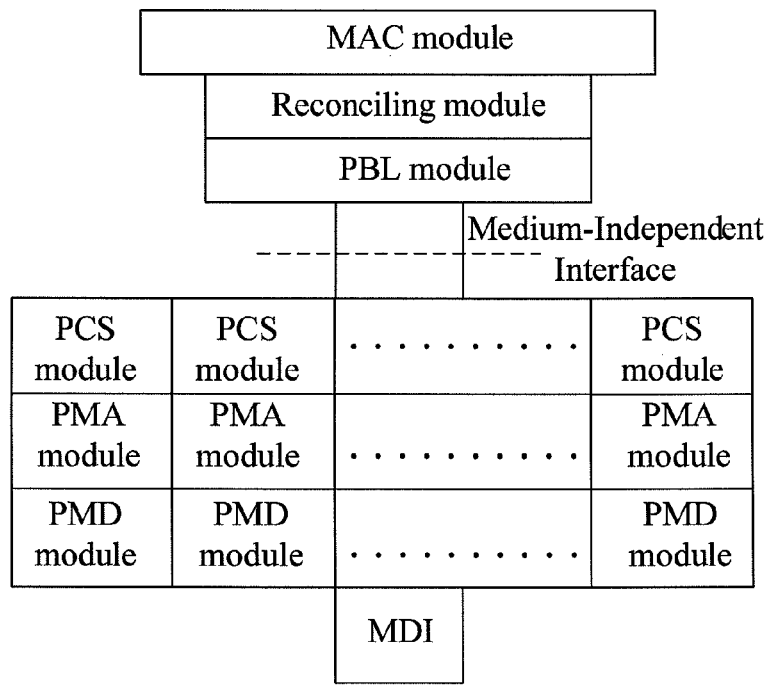
FIG. 1 shows a multi-lane high-speed Ethernet model in the prior art.
Figure 2A:
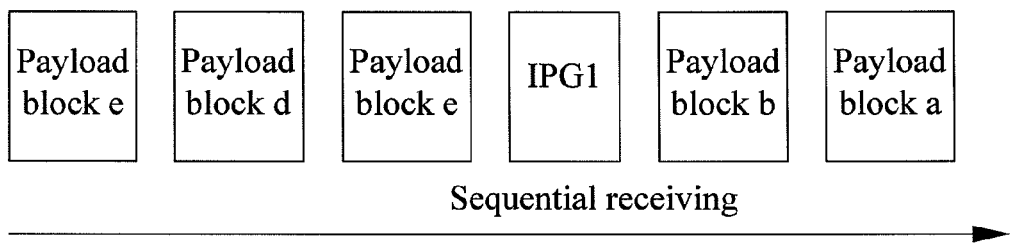
FIG. 2a to FIG. 2e show a method for sending an OAM overhead in the prior art.
Figure 2B:
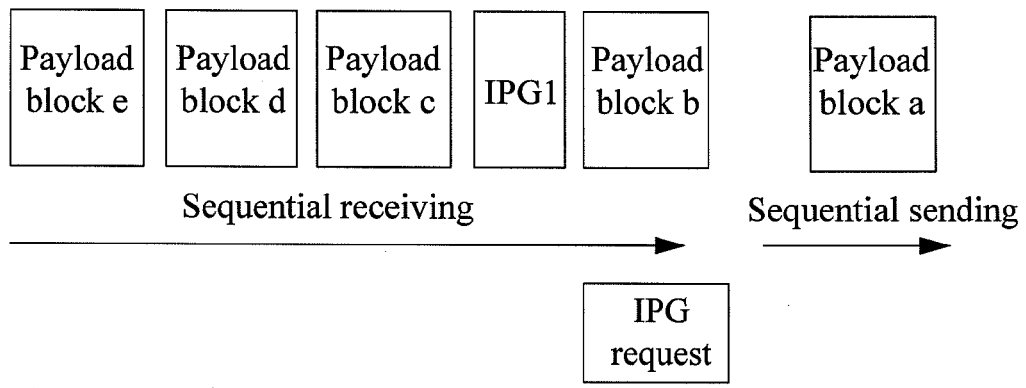
Figure 2C:
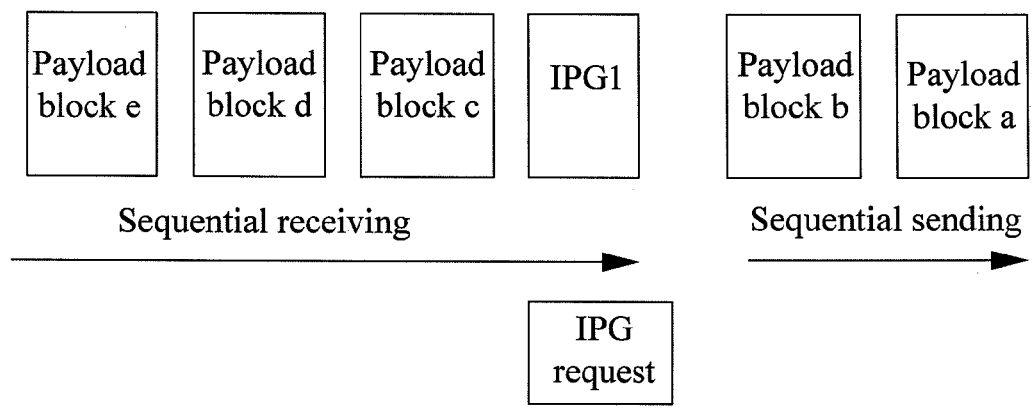
Figure 2D:
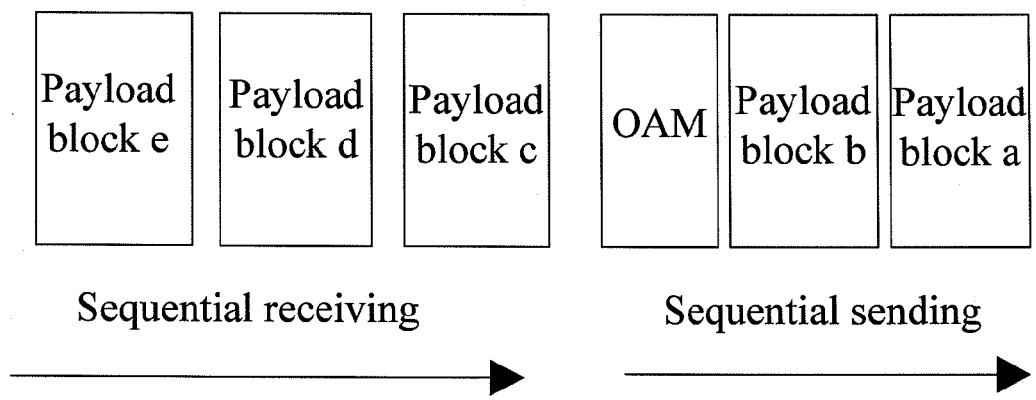
Figure 2E:
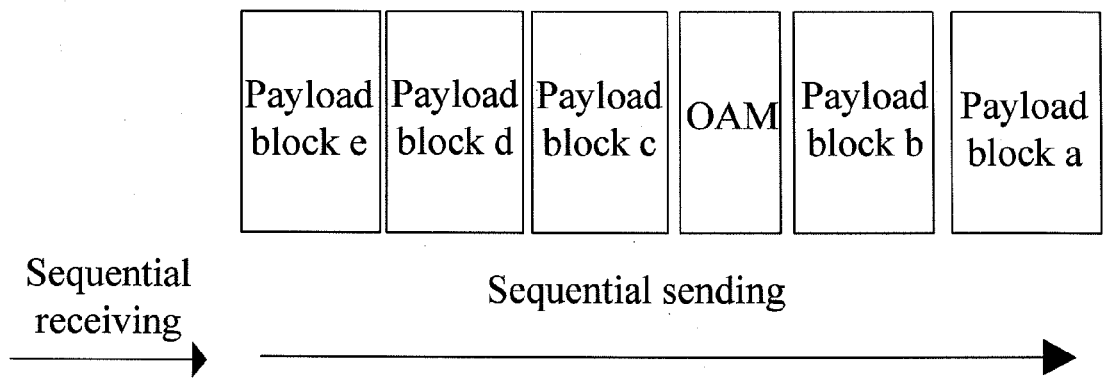

It is assumed that the data stream includes a first MAC frame, an IPG1, and a second MAC frame, as shown in FIG. 2a. The first MAC frame includes a payload block a and a payload block b. The second MAC frame includes a payload block c, a payload block d, and a payload block e.

It is assumed that the number of IPGs in the IPG buffer is less than the preset upper threshold. After step A, the IPG buffer includes IPG1; the data buffer includes the payload block a and the payload block b of the first MAC frame, and includes the payload block c, the payload block d and the payload block e of the second MAC frame.

Step B: The RS module receives the request for providing IPGs, and removes the IPG1 in the IPG buffer and sends it to the OAM sending module.

Figure 4:
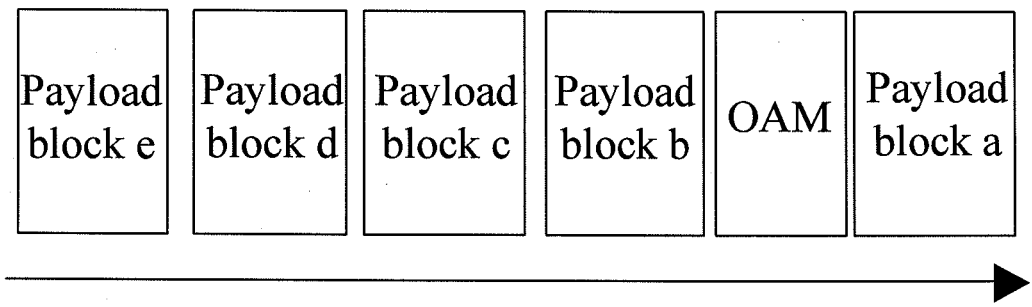
FIG. 4 shows a data stream finally sent in the sending method in an embodiment of the present invention.

Step C: The OAM sending module replaces the IPG1 with the OAM overhead to be sent, sends the OAM overhead, and then forwards the payload block b in the first MAC frame, and the payload block c, payload block d, and payload block e in the second MAC frame, where the MAC frames are sent by the RS module and stored in the data buffer. The forwarded data stream is shown in FIG. 4.

Figure 5:
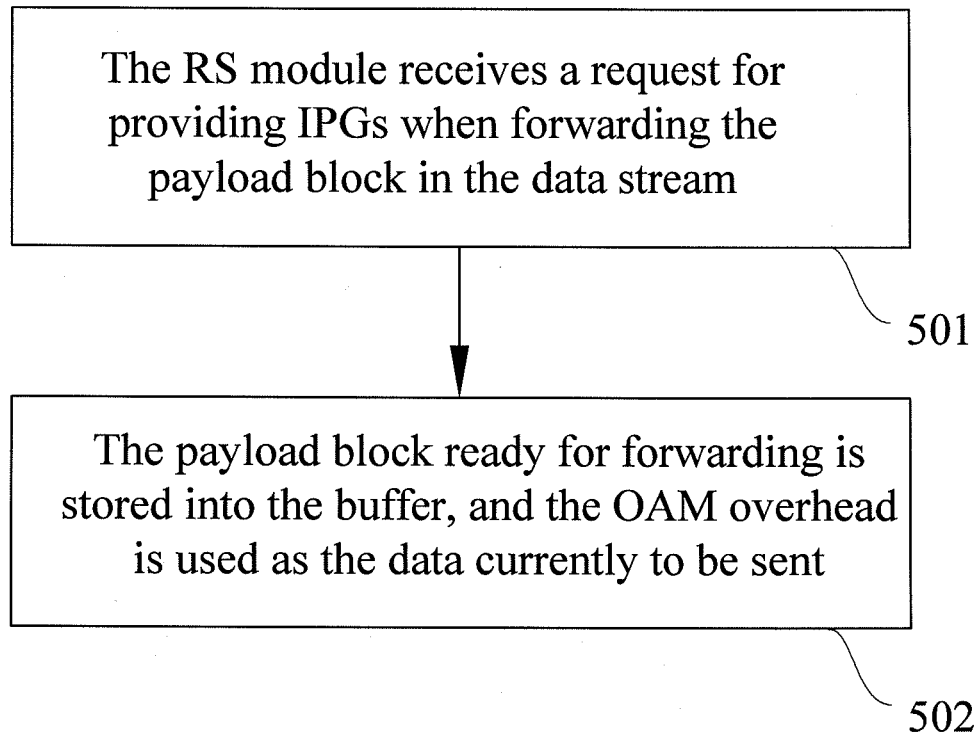
FIG. 5 is a flowchart of a sending method in the second embodiment of the present invention.

Provided below is the second method embodiment of the present invention. As shown in FIG. 5, the method in the second embodiment of the present invention includes the following steps:

Step 501: The RS module receives a request for providing IPGs when forwarding the payload block in the data stream. The requested IPGs are used for sending OAM overheads.

More specifically, this step may include step 501*a* and step 501*b*:

Step 501*a*: The RS module forwards the payload block in the data stream. It is assumed that the data stream includes a first MAC frame, an IPG1, and a second MAC frame, as shown in FIG. 6*a*. The first MAC frame includes a payload block a and a payload block b. The second MAC frame includes a payload block c, a payload block d, and a payload block e. The RS module receives a request for providing IPGs when forwarding the payload block in the MAC data stream, for example, when forwarding the payload block b.

Step 501*b*: The OAM generating module responds to the request for sending OAM overhead, which is sent by the OAM control-plane module. The response requests the RS module to provide the IPGs required for sending the OAM overhead.

Step 502: The payload block ready for forwarding is stored into the buffer, and the OAM overhead is used as the data currently to be sent.

As shown in FIG. 6*b*, the payload block b is stored into the buffer, and the RS module generates an extra IPG; namely, IPG b in FIG. 6*b*, and sends the IPG b to the OAM sending module.

Figure 6C:
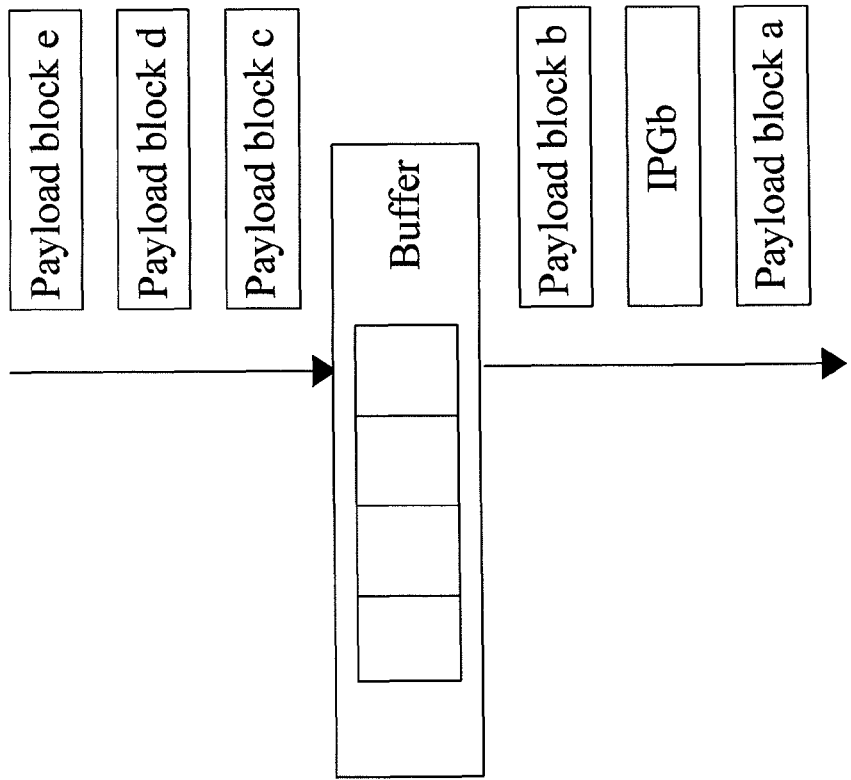
Figure 6D:
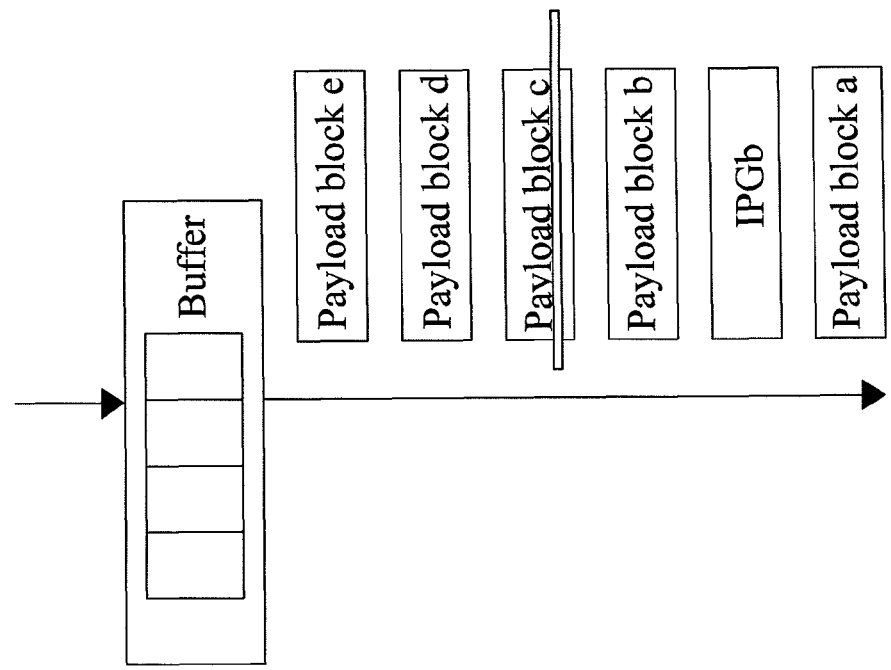

As shown in FIG. 6*c*, the RS module uses the IPG1 in the forwarded subsequent data stream to send the payload block b in the buffer to the OAM sending module. The OAM sending module forwards the payload block b, and forwards the subsequent data stream, for example, payload block c, payload block d, and payload block e in FIG. 6*c*. The finally sent data stream is shown in FIG. 4.

In the preceding step, after receiving the request for providing IPGs, the RS module stores the forwarded payload block in the data stream into the data buffer, uses the OAM overhead as the data currently to be sent, and sends the OAM overhead. Then, the RS module sends the payload block and the subsequent data stream in the data buffer. In this way, the order of sending the IPGs and the payload block in the data stream is adjusted, and the OAM overhead is sent in time.

The preceding step may further includes: notifying the MAC module to reduce the rate of the payload blocks in the data stream when the number of payload blocks in the buffer reaches or exceeds the preset upper threshold.

When the number of payload blocks in the buffer reaches or exceeds the preset upper threshold, it indicates that the buffer is not enough for storing the payload blocks in the data stream, and no enough extra IPGs can be generated. In this case, the MAC module is notified to reduce the rate of the payload blocks in the data stream, and the IPGs in the data streams are increased accordingly. Therefore, the buffer has more space for storing the payload blocks, and can generate more extra IPGs to meet the requirement of sending more OAM overheads.

In the first method embodiment and the second method embodiment, the OAM overhead sent by the OAM sending module can be sent in different lanes independently, thus implementing connectivity monitoring and fault management for different lanes of the Ethernet.

Provided below is an embodiment of a receiving method in the present invention.

Figure 7:
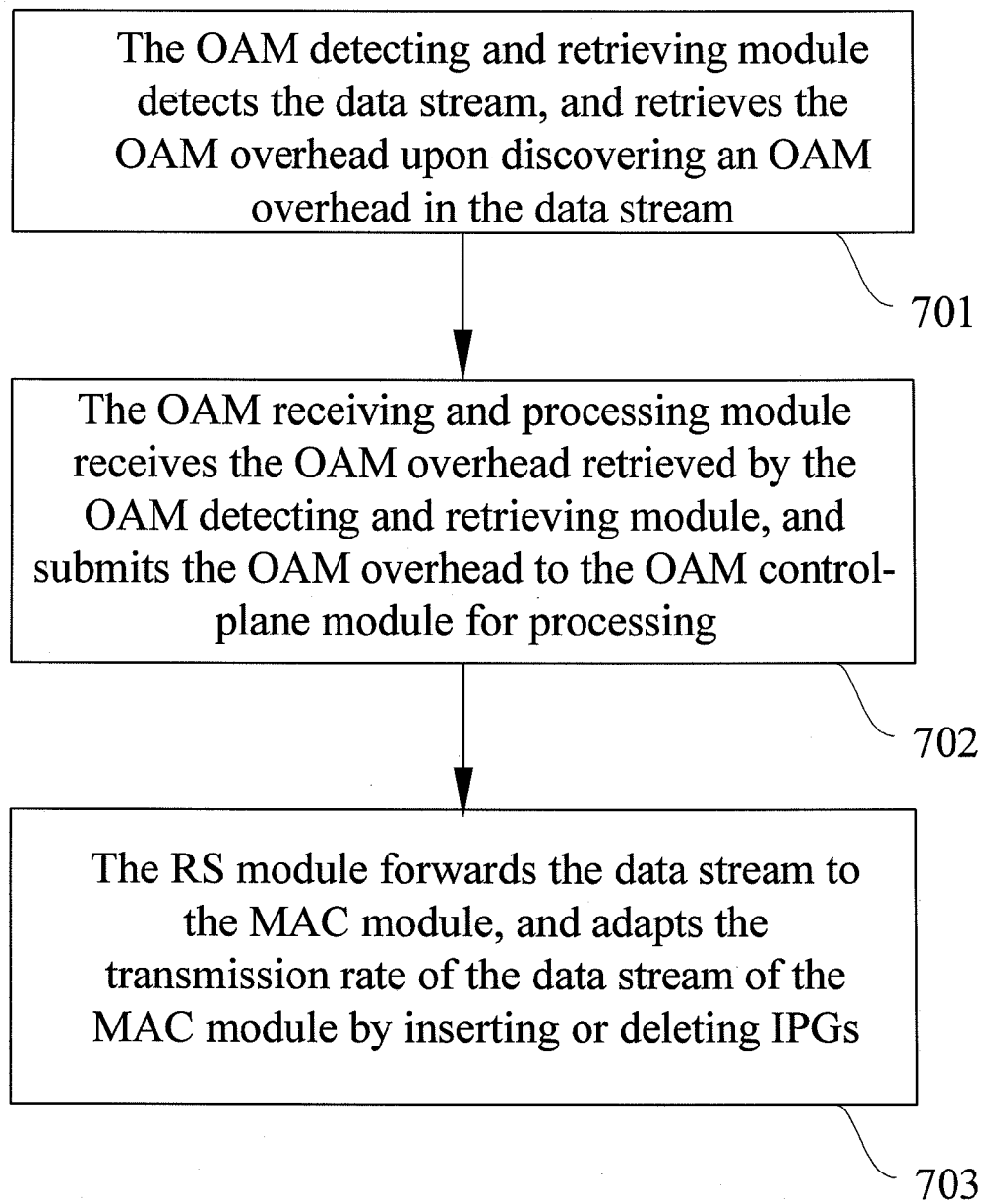
FIG. 7 is a flowchart of a receiving method in an embodiment of the present invention.

As shown in FIG. 7, a receiving method in an embodiment of the present invention includes the following steps:

Step 701: The OAM detecting and retrieving module detects the data stream, and retrieves the OAM overhead when discovering an OAM overhead in the data stream.

The OAM overhead has the code block characteristics different from the payload block in the data stream. Therefore, the OAM detecting and retrieving module may detect the code block characteristics in the data stream, and retrieve the OAM overhead.

Step 702: The OAM receiving and processing module receives the OAM overhead retrieved by the OAM detecting and retrieving module, and submits the OAM overhead to the OAM control-plane module for processing.

In this step, the OAM detecting and retrieving module sends the retrieved OAM overhead to the OAM receiving and processing module. After the OAM receiving and processing module processes the OAM overhead, the OAM control plane at the receiver performs the corresponding monitoring and management functions.

Step 703: The RS module receives and forwards the data stream to the MAC module, and adapts the transmission rate of the data stream of the MAC module by inserting IPGs or deleting IPGs.

In the preceding embodiment, the data stream received at the receiver has enough OAM overhead information. By retrieving the OAM overhead, the OAM control-plane module can receive the OAM overhead information correctly and perform the corresponding operations. If the OAM overhead is sent independently in different lanes, the receiver can monitor and manage every lane according to the received OAM overhead.

Figure 8:
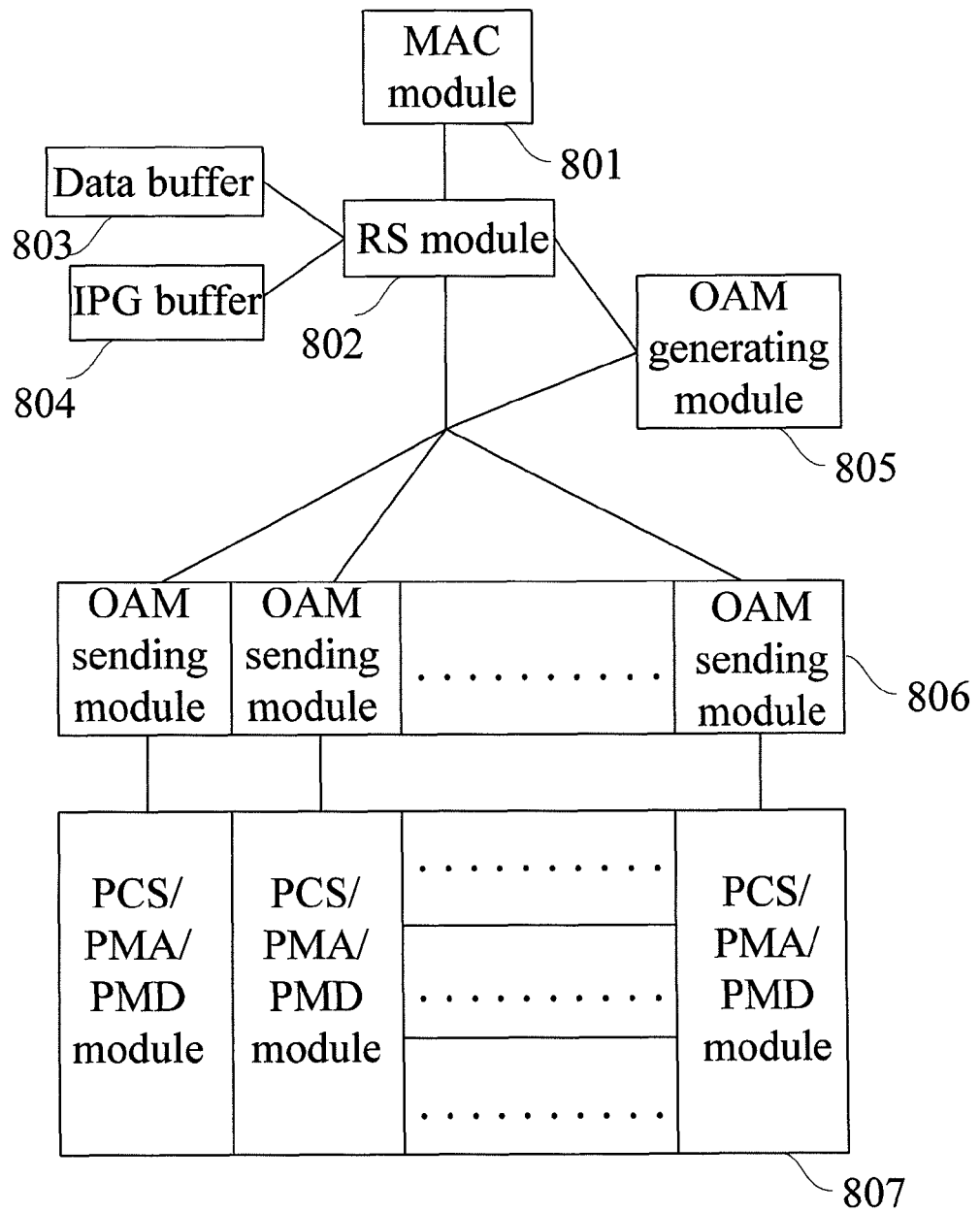
FIG. 8 shows a sending apparatus in the first embodiment of the present invention.

Provided below is the first embodiment of a sending apparatus in the present invention. FIG. 8 is a block diagram of a sending apparatus in the first embodiment of the present invention.

An apparatus for sending an Ethernet physical-layer OAM overhead includes: an MAC module 801, a reconciling module 802, a data buffer 803, an IPG buffer 804, an OAM generating module 805, at least one OAM sending module 806, and at least one PCS/PMA/PMD module 807.

The MAC module 801 is adapted to generate a data stream which includes payload blocks and IPGs.

The reconciling module 802 is adapted to receive data streams, store part of IPGs in the data stream into the IPG buffer 804, and store the remaining IPGs and the payload blocks in the data stream into the data buffer 803; receive the request for providing IPGs from the OAM generating module 805, retrieve the IPGs from the IPG buffer 804, and send the IPGs to the OAM sending module 806.

The data buffer 803 is adapted to store the payload blocks and the IPGs.

The IPG buffer 804 is adapted to store the IPGs.

The OAM generating module 805 is adapted to generate the OAM overhead, and request the reconciling module 802 to provide the IPGs.

The OAM sending module 806 is adapted to use the IPGs in the IPG buffer 804 to send the OAM overhead to the PCS/PMA/PMD module 807, and forward the IPGs and the payload blocks sent by the reconciling module 802 and stored in the data buffer 803 to the PCS/PMA/PMD module 807.

The PCS/PMA/PMD module 807 is adapted to process and forward the OAM overhead and the payload blocks. The processing may include: encoding, decoding, scrambling/descrambling, serial-parallel/parallel-serial conversion, and optical-electrical/electrical-optical conversion.

When the number of IPGs stored in the IPG buffer 804 reaches or exceeds the preset upper threshold, the reconciling module 802 writes the IPGs in the data stream into the data buffer.

When the number of IPGs stored in the IPG buffer 804 is less than the preset upper threshold, the reconciling module writes the IPGs in the data stream into the extra IPG buffer 804.

The reconciling module 802 is further adapted to notify the MAC module 801 to reduce the rate of the payload blocks in the data stream when the number of IPGs in the IPG buffer 804 is less than the preset lower threshold.

The reconciling module 802 is further adapted to notify the MAC module 801 not to reduce the rate of the payload blocks in the data stream any more when the number of IPGs in the IPG buffer 804 reaches or exceeds the preset lower threshold.

The method for using the preceding receiving apparatus to receive the OAM overhead is similar to the preceding receiving method.

Figure 9:
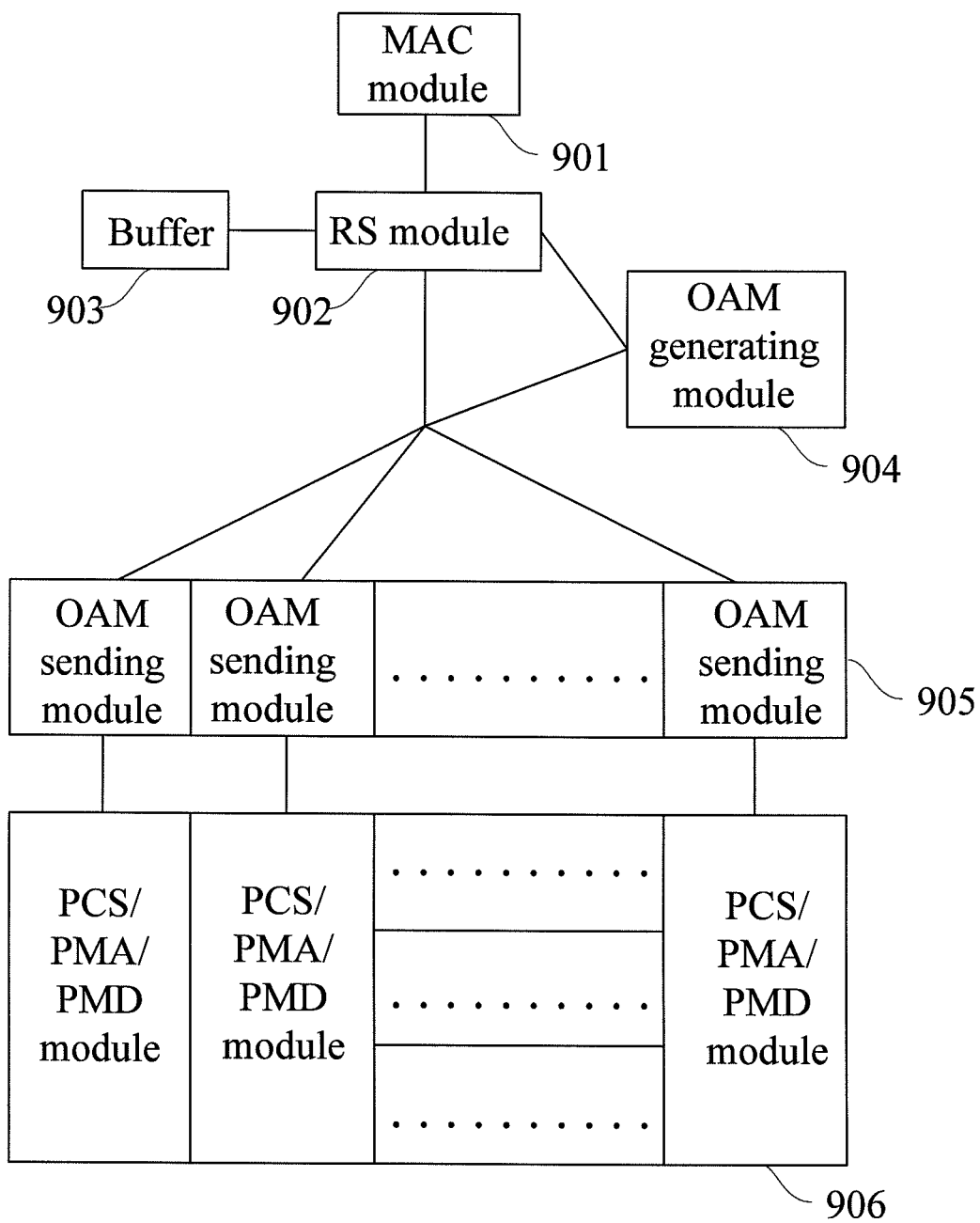
FIG. 9 is a block diagram of a sending apparatus in the second embodiment of the present invention.

Provided below is the second embodiment of a sending apparatus in the present invention. FIG. 9 is a block diagram of a sending apparatus in the second embodiment of the present invention.

An apparatus for sending an Ethernet physical-layer OAM overhead includes: an MAC module 901, a reconciling module 902, a buffer 903, an OAM generating module 904, at least one OAM sending module 905, and at least one PCS/PMA/PMD module 906.

The MAC module 901 is adapted to generate a data stream which includes payload blocks and IPGs.

The reconciling module 902 is adapted to receive the request for providing IPGs from the OAM generating module 904 when forwarding the payload blocks in the data stream, store the forwarded payload blocks in the data stream into the buffer 903, generate an extra IPG, and send the extra IPG to the OAM sending module 905.

The buffer 903 is adapted to store the payload blocks.

The OAM generating module 904 is adapted to generate the OAM overhead, and request the reconciling module 902 to provide the IPGs.

The OAM sending module 905 is adapted to store the payload blocks ready for forwarding into the buffer, use the OAM overhead as the data currently to be sent, and forward the IPGs and the payload blocks stored in the data buffer and sent by the reconciling module 902 to the PCS/PMA/PMD module 906.

The PCS/PMA/PMD module 906 is adapted to process and forward the OAM overhead, the payload blocks in the buffer, and the data stream.

When the number of payload blocks in the buffer 903 reaches or exceeds the preset upper threshold, the reconciling module 902 is further adapted to notify the MAC module 901 to reduce the rate of the payload blocks in the data stream.

When the number of payload blocks in the buffer 903 is less than the preset lower threshold, the reconciling module 902 is further adapted to notify the MAC module 901 not to reduce the rate of the payload blocks in the data stream.

The method for using the preceding sending apparatus to send the OAM overhead is similar to the preceding sending method.

Figure 10:
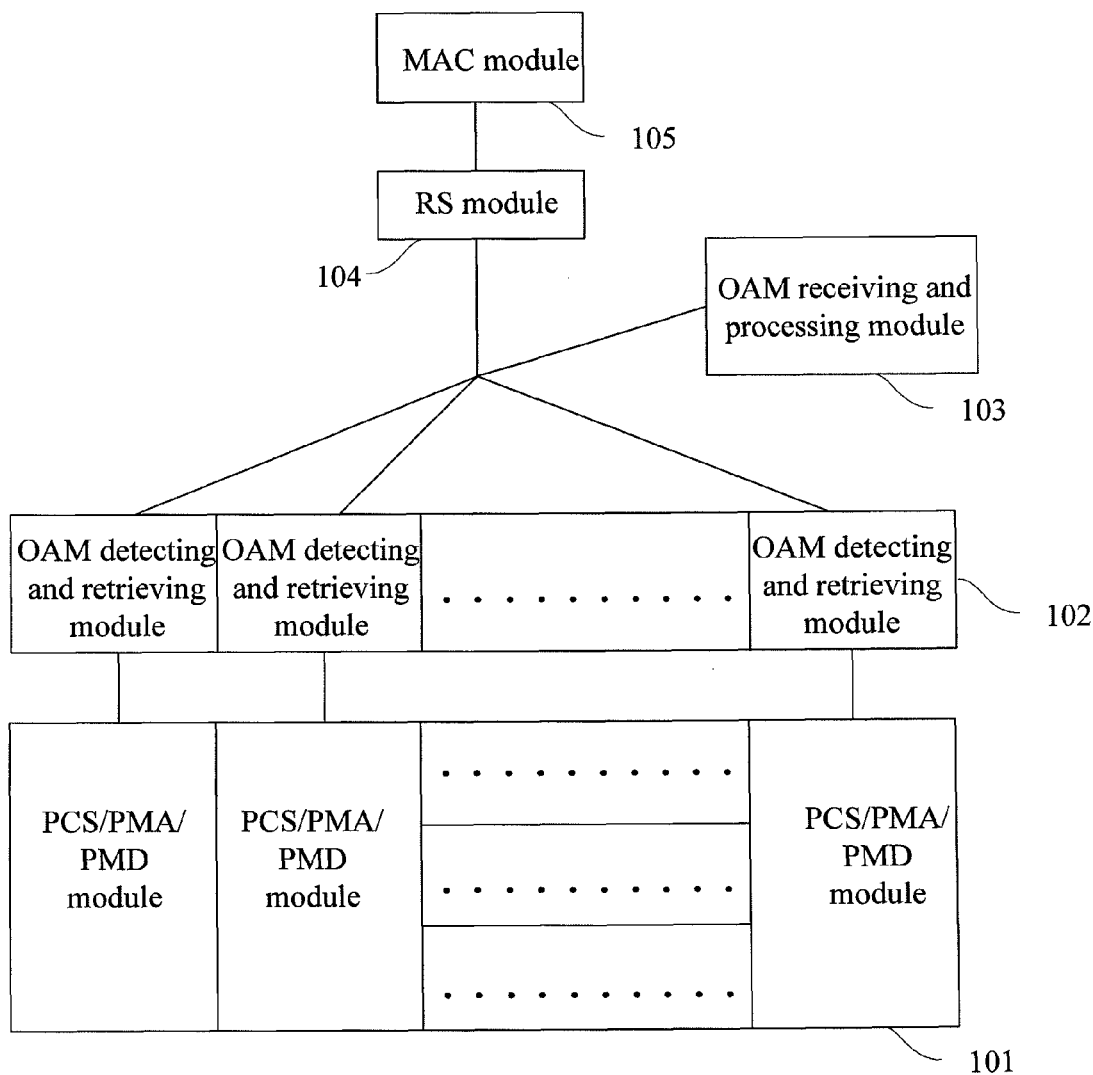
FIG. 10 is a block diagram of a receiving apparatus in an embodiment of the present invention.

Provided below is an embodiment of a receiving apparatus in the present invention. FIG. 10 is a block diagram of the receiving apparatus.

An apparatus for receiving an Ethernet physical-layer OAM overhead includes: at least one PCS/PMA/PMD module 101, at least one OAM detecting and retrieving module 102, an OAM receiving and processing module 103, a reconciling module 104, and an MAC module 105.

The PCS/PMA/PMD module 101 is adapted to forward the received data stream to the OAM detecting and retrieving module, where the data stream includes MAC frame data, OAM overhead, and IPGs.

The OAM detecting and retrieving module 102 is adapted to detect the data stream, and retrieve the OAM overhead when discovering an OAM overhead in the data stream.

The OAM receiving and processing module 103 is adapted to receive the OAM overhead sent by the OAM detecting and retrieving module, and submit the OAM overhead to the OAM control-plane module for processing.

The reconciling module 104 is adapted to forward the data stream to the MAC module, and adapt the transmission rate of the data stream of the MAC module by inserting or deleting IPGs.

After being retrieved by the OAM detecting and retrieving module, the OAM overhead in the data stream becomes an IPG, and is still located in the data stream forwarded by the reconciling module.

The MAC module 105 is adapted to receive the data stream sent by the reconciling module 104.

The method for using the preceding receiving apparatus to receive the OAM overhead is similar to the preceding receiving method.

Although the invention has been described through several preferred embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

The embodiments of the present invention may be described in ordinary contexts of computer-executable instructions, for example, a program module. Generally, the program module includes routines, programs, objects, components, and data structures which execute a specific task or implement a specific abstract data type. The embodiments of the present invention may also be implemented in a distributed computation environment, in which the tasks are performed by remote processing devices connected through a communications network. In the distributed computation environment, the program module may be located in local and remote computer storage media such as a storage device.

Based on the descriptions of the preceding embodiments, those skilled in the art may understand that the present invention may be implemented by software and a necessary universal hardware platform. Therefore, the essence of the technical solution under the present invention or the contributions to the prior art may be embodied as a software product. The software product may be stored in a computer-readable storage medium (for example, ROM/RAM, magnetic disk, or CD) and may incorporate several instructions for instructing a computer device (for example, a personal computer, a server, or a network device) to execute the method specified in all or part of the embodiments of the present invention.

What is claimed is:

1. A method for sending an Ethernet physical-layer Operation Administration Maintenance (OAM) overhead, comprising:
adjusting a communication order of payload blocks and part of Inter-Packet Gaps (IPGs) in a data stream which is to be transmitted; and
substituting the part of the IPGs with an OAM overhead when a request for sending the OAM overhead has been received; and
sending the OAM overhead before sending the payload blocks.

2. The method of claim 1, further comprising:
sending the payload blocks and remaining IPGs in the data stream after sending the OAM overhead.

3. The method of claim 2, further comprising:
reducing a rate of the payload blocks in the data stream when an amount of IPGs stored in an IPG buffer is less than a preset lower threshold.

4. The method of claim 1, wherein the adjusting of the communication order comprising:
storing the substituted part of the IPGs in the data stream into an IPG buffer; and
storing the payload blocks and the remaining IPGs in the data stream into a data buffer.

5. The method of claim 4, wherein the storing of the substituted part of the IPGs in the data stream into the IPG buffer and the storing of the payload blocks and the remaining IPGs in the data stream into the data buffer comprising:
writing all IPGs in the data stream into the data buffer when an amount of IPGs stored in the IPG buffer reaches or exceeds a preset upper threshold; and
storing the payload blocks in the data stream into the data buffer.

6. An apparatus for sending an Ethernet physical-layer Operation Administration Maintenance (OAM) overhead, comprising:
a data buffer, configured to store payload blocks and Inter-Packet Gaps (IPGs);
an IPG buffer, configured to store the IPGs;
a reconciling module, configured to store part of the IPGs in a received data stream into the IPG buffer and store the payload blocks and remaining IPGs in the received data stream into the data buffer; and
at least one OAM sending module, configured to substitute the IPGs stored in the IPG buffer with an OAM overhead, and send the OAM overhead.

7. The sending apparatus of claim 6, wherein:
the reconciling module is further configured to send the IPGs stored in the IPG buffer to the OAM sending module, and then send the payload blocks and the remaining IPGs in the data buffer to the OAM sending module.

8. The sending apparatus of claim 6, wherein:
when an amount of IPGs stored in the IPG buffer reaches or exceeds a preset upper threshold, the reconciling module is further configured to write all the IPGs in the received data stream into the data buffer.

9. The sending apparatus of claim 6, wherein:
when an amount of extra IPGs stored in the IPG buffer is less than a preset lower threshold, the reconciling module is further configured to reduce a rate of the payload blocks in the received data stream.

* * * * *